(12) United States Patent
Tailor et al.

(10) Patent No.: US 9,393,723 B2
(45) Date of Patent: Jul. 19, 2016

(54) METHOD OF FILLING A CASING

(75) Inventors: Dilip Tailor, Mississauga (CA); Aaron Klejman, Toronto (CA); Pascal Laferriere, Toronto (CA); Dieter Trapmann, Schauernheim (DE)

(73) Assignee: SHAWCOR LTD, Toronto (CA)

( * ) Notice: Subject to any disclaimer, the term of this patent is extended or adjusted under 35 U.S.C. 154(b) by 1213 days.

(21) Appl. No.: 13/140,621

(22) PCT Filed: Dec. 9, 2009
(Under 37 CFR 1.47)

(86) PCT No.: PCT/CA2009/001750
§ 371 (c)(1),
(2), (4) Date: Sep. 6, 2011

(87) PCT Pub. No.: WO2010/069044
PCT Pub. Date: Jun. 24, 2010

(65) Prior Publication Data
US 2012/0223452 A1  Sep. 6, 2012

(30) Foreign Application Priority Data

Dec. 19, 2008  (CA) ..................................... 2647972

(51) Int. Cl.
B29C 44/12     (2006.01)
F16L 47/22     (2006.01)
F16L 55/175    (2006.01)
F16L 59/20     (2006.01)
B29L 23/00     (2006.01)

(52) U.S. Cl.
CPC ......... B29C 44/1242 (2013.01); B29C 44/1295 (2013.01); F16L 47/22 (2013.01); F16L 55/175 (2013.01); F16L 59/20 (2013.01); B29L 2023/225 (2013.01)

(58) Field of Classification Search
USPC ............ 264/46.4, 46.6, 248, 261, 263, 342 R
See application file for complete search history.

(56) References Cited

U.S. PATENT DOCUMENTS

| | | | | |
|---|---|---|---|---|
| 3,731,710 A | * | 5/1973 | Bauer | F16L 59/02 138/109 |
| 4,472,468 A | * | 9/1984 | Tailor et al. | 428/57 |
| 4,532,168 A | * | 7/1985 | Steele et al. | 428/99 |
| 4,728,550 A | * | 3/1988 | Van Beersel et al. | 428/34.9 |
| 4,746,147 A | | 5/1988 | Walker | |
| 4,909,669 A | | 3/1990 | Baker | |
| 5,175,032 A | * | 12/1992 | Steele et al. | 428/34.9 |
| 5,489,405 A | * | 2/1996 | Holbert et al. | 264/35 |
| 5,490,742 A | * | 2/1996 | Cronk | 405/157 |
| 5,736,715 A | * | 4/1998 | Keyes | 219/535 |
| 5,804,093 A | * | 9/1998 | Wyke et al. | 249/90 |

(Continued)

FOREIGN PATENT DOCUMENTS

FR  2735416   6/1995
GB  1176418   1/1970

*Primary Examiner* — Atul P. Khare
(74) *Attorney, Agent, or Firm* — DeLio, Peterson & Curcio, LLC; Kelly M. Nowak

(57) ABSTRACT

Foam filling a cavity in a joint between insulated pipe lengths by wrapping a fiber reinforced plastic mold sheet around the cavity or applying a casing around the cavity, with a securing element supplied on the mold sheet to resist separating movements of the ends of the mold sheet or one or more flexible tensile members wrapped around the casing, to resist ballooning of the casing on expansion of a foam filling introduced into the mold or into the casing.

19 Claims, 10 Drawing Sheets

(56) References Cited

U.S. PATENT DOCUMENTS

| | | | |
|---|---|---|---|
| 5,900,195 A * | 5/1999 | Pool et al. | 264/46.5 |
| 6,355,318 B1 | 3/2002 | Tailor et al. | |
| 6,402,201 B1 * | 6/2002 | Pool et al. | 285/47 |
| 6,736,430 B1 * | 5/2004 | Meulemans et al. | 285/47 |
| 7,407,197 B2 * | 8/2008 | Gronquist | 285/47 |
| 7,472,476 B2 * | 1/2009 | Gronquist | 29/825 |
| 2001/0041235 A1 * | 11/2001 | Tailor et al. | 428/36.1 |
| 2007/0063509 A1 * | 3/2007 | Gronquist | 285/294.2 |

* cited by examiner

METHOD OF FILLING A CASING

This application claims the benefit of the filing date of Canadian Patent Application No. 2,647,972 filed Dec. 19, 2008 under the title METHOD OF FILLING A CASING.

The content of the above patent application is hereby expressly incorporated by reference into the detailed description hereof.

The present invention relates to method and apparatus for foam filling a cavity in a joint between insulated pipe lengths.

Such method and apparatus are known, for example, from our U.S. Pat. No. 6,355,318 issued Mar. 12, 2002.

Known methods and apparatus of which the applicant aware employ relatively sturdy heat shrinkable casings for surrounding the foam filling that are designed to withstand the stresses to which the casings are subjected in use, for example the stress that the foam exerts on the casing as it expands to fill the cavity in the course of foam filling the joint.

The use of heavy weight heat-shrinkable casings may not always be desirable or economically advantageous, however.

One aspect of the invention relates to a method wherein foam filling may be pre-formed before applying a casing around the filling. In this aspect, the invention provides a method of foam filling a cavity in a joint between insulated pipe lengths, comprising wrapping around the cavity a mold sheet comprising a fibre reinforced plastic sheet and having opposing ends overlapped to form a cylindrical mold; introducing a curable foam precursor in said cavity; the mold sheet having tensile strength that resists ballooning of the foam filling on expansion thereof from curable foam precursor; applying securing elements on the mold to resist circumferential separating movement of the overlapped ends upon expansion of the filling; allowing said precursor to foam and cure; and removing said securing elements and said mold sheet. The fibre reinforced plastic sheet provides the advantages of offering excellent resistance to ballooning while being of relatively light weight.

A further aspect of the invention relates to providing a casing around the cavity before foam filling. In this aspect the invention provides a method of foam filling a cavity in a joint between insulated pipe lengths, comprising applying a casing around the cavity, wrapping at least one flexible tensile member around the casing; introducing a curable foam precursor in said cavity through an opening in the casing; allowing said precursor to foam and cure; the flexible member having tensile strength that resists ballooning of the casing on expansion of the foam filling from the curable foam precursor; including the step of applying a securing element on the flexible member to resist girthwise extension of the flexible member on expansion of the filling; and removing said flexible member and said securing element.

The at least one flexible tensile member may comprise two or more strap elements, for example conventional polypropylene or nylon webbing straps woven from, for example, multifilament yarn.

In one preferred form, the flexible member is a flexible sheet having opposing ends overlapped.

In a further aspect, the invention provides apparatus for foam filling a cavity in a joint between insulated pipe lengths, comprising a fibre reinforced plastic sheet having opposing ends that can be overlapped to form a cylindrical mold wrapped around the cavity, and securing elements that apply on the sheet to resist circumferential separation of the overlapped ends of the sheet on expansion of the filling.

The above aspects of the present invention allow a relatively thin walled casing to be employed, if desired, since it need not be capable of withstanding the pressure of the expanding foam, as that function is performed by the sheet or flexible tensile member.

The fibre reinforced plastic or other sheet provides a particularly convenient way of providing a stress-resisting mold around the insulated pipeline joint cavity.

The tensile strength required for the sheet or flexible member to resist ballooning when the foam expands may be readily determined in any given case by simple trial and experiment.

"Ballooning" refers to expansion of the sheet or of the casing that is visible to the eye.

In preferred forms, the sheet or flexible member has a Young's modulus, as measuring by ASTM D638 (or ASTM D6775-02 in the case of textile webbing) of at least 5-25 GPa, more preferably at least 15 GPa.

The invention will be more fully described, by way of example only with reference to the accompanying drawings, in which.

Figure 1:
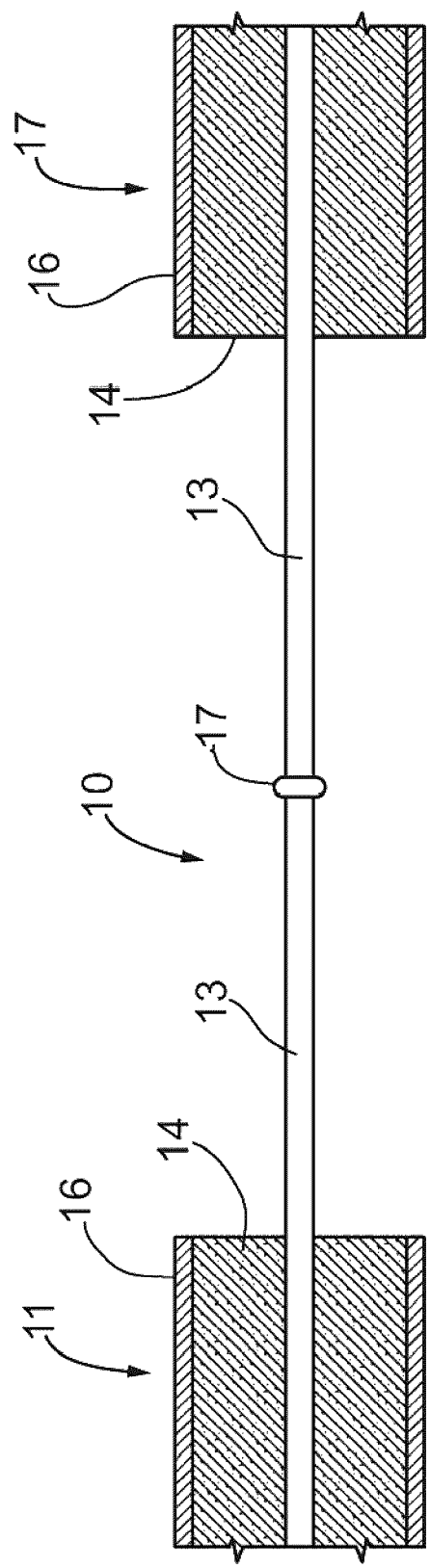
FIG. 1 shows a side view, partly in cross-section through a joint between insulated pipe lengths, and the cavity therebetween.

FIG. 1 shows a cavity 10 between adjacent ends of pipe line lengths 11 and 12 each comprising a pipe 13, insulation material 14 and a cylindrical pipe jacket 16, usually of polymer material.

The ends of the pipes 13 are left bare to allow the ends to be welded together at 17.

Figure 2:
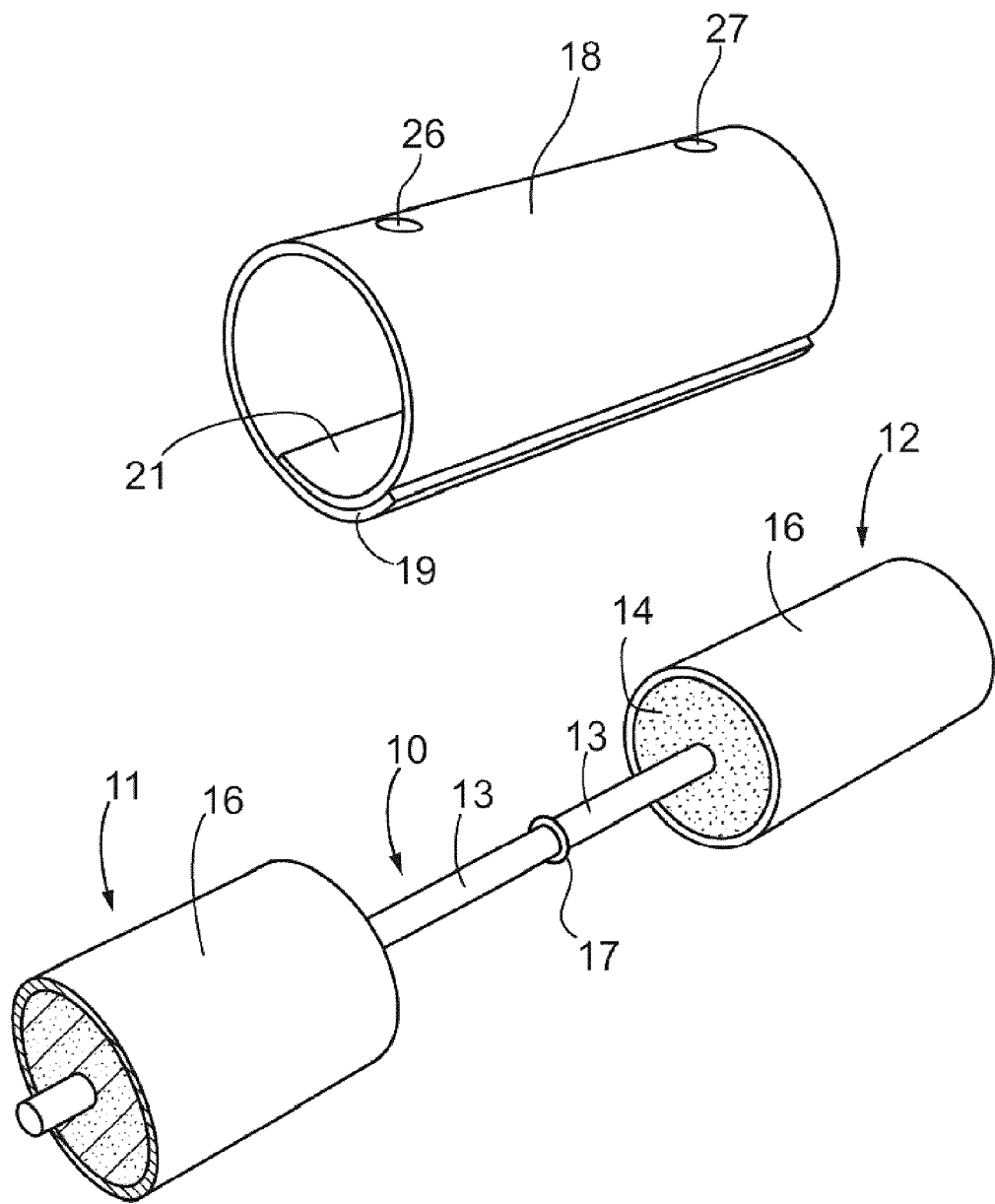
FIGS. 2 to 5 are perspective views and FIG. 6 to are schematic side views, partially in cross-section, illustrating steps in forming a foam insulation filling in the cavity, according to one embodiment of the invention.

In one form of the present invention, a resiliently flexible coil form sheet 18 is employed as shown in FIG. 2.

In the embodiment described below with reference FIGS. 2 to 8, a foam insulation body 30 is formed in contact with an inner surface of the sheet 18, which functions as a mold sheet.

Figure 3:
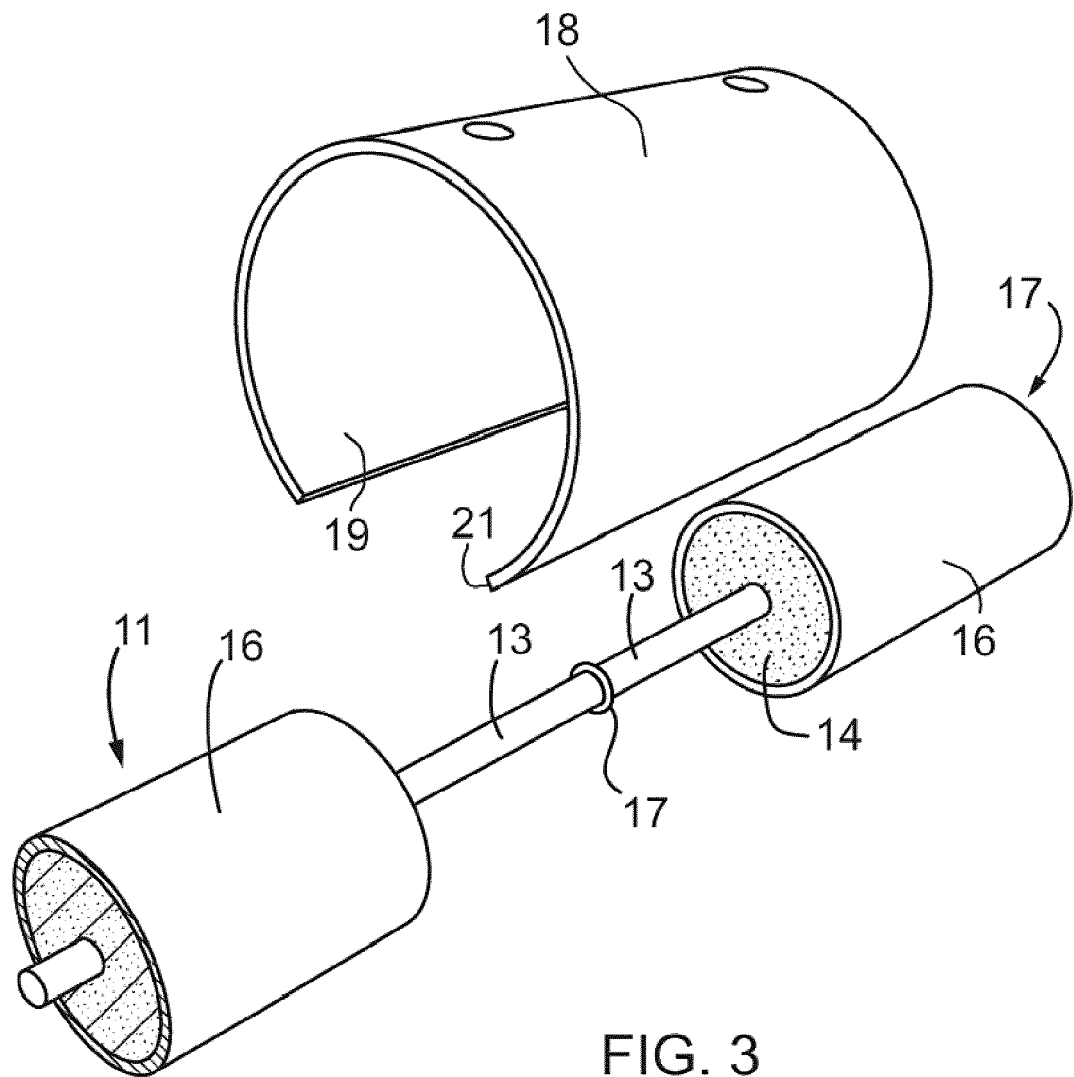
Figure 4:
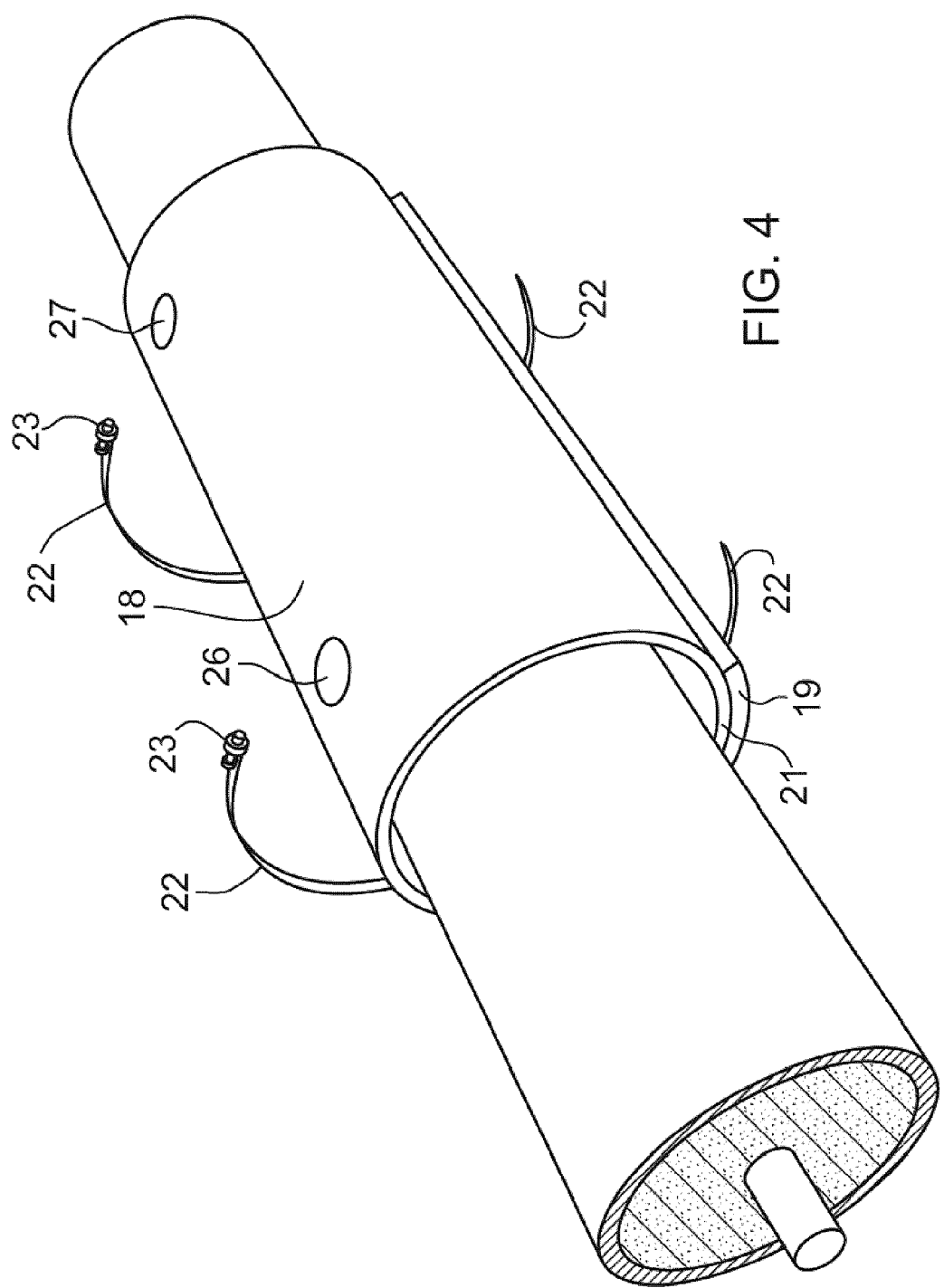
Figure 6:
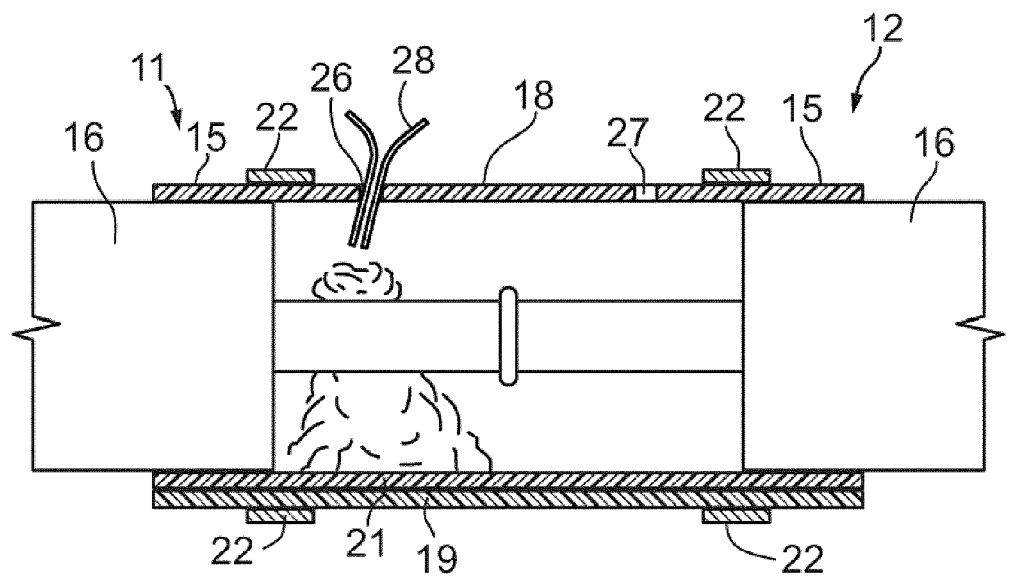
Figure 7:
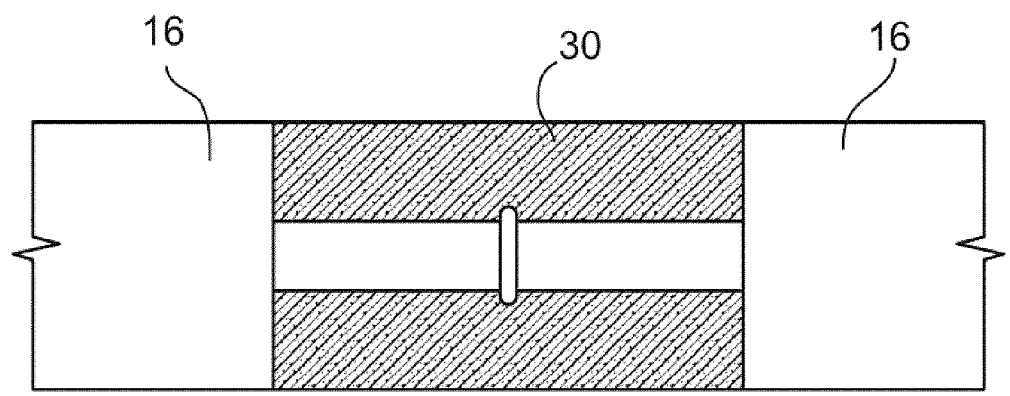

As seen in FIG. 2 in a relaxed condition, the sheet 18 adopts a cylindrical coil condition. In one preferred embodiment of the present method, as seen in FIG. 3, the sheet 18 is partially uncoiled and is lowered over the joint and, as seen in FIGS. 3 and 4 is positioned in an encircling position around the joint. The sheet 18 is selected so that its width provides an axial length such that its sides overlap the adjacent ends of the pipe jackets 16, as seen in FIG. 6.

In a preferred form, the resilient sheet 18 is selected so that, in the relaxed condition, seen in FIG. 2, its diameter is less than that of the jackets 16 while its circumferential length is such that, in the fitted position, shown in FIG. 4, the ends 19 and 21 overlap, with the sheet 18 in a resiliently expanded condition. In this condition, the resilient reaction causes the sheet 18 to grip tightly around the adjacent end portions of the jackets 16 and is retained in position by the resultant frictional forces. As will be appreciated, the frictional gripping greatly facilitates positioning of the sheet 18 around the cavity 10 to form a mold.

While other similar resiliently flexible coil form sheet material may be employed, in one preferred form, the resiliently flexible coil form sheet 18 is a fibre reinforced plastic sheet, such as that available from Clock Spring Company, Long Beach, Calif.

The preferred fibres used to form the composite resilient fibre reinforced plastic sheet 18 have a Young's modulus of at least 50 GPa. Such fibres will include glass, aramid fibre (for example Kevlar (trade-mark) available from Dupont), carbon and steel fibres. The resin employed in making the composite may include epoxy, polyester, polyurethane, phenolics, nylons, and others known to those skilled in the art.

For example, a glass fibre filled epoxy resin sheet may be employed. Such sheet typically provides a Young's modulus of 10 GPa (as measured by ASTM D638). As a further example, a unidirectional glass fibre filled epoxy resin sheet may be employed. Such sheet provides a Young's modulus of greater than 20 GPa (ASTM D638).

Figure 5:
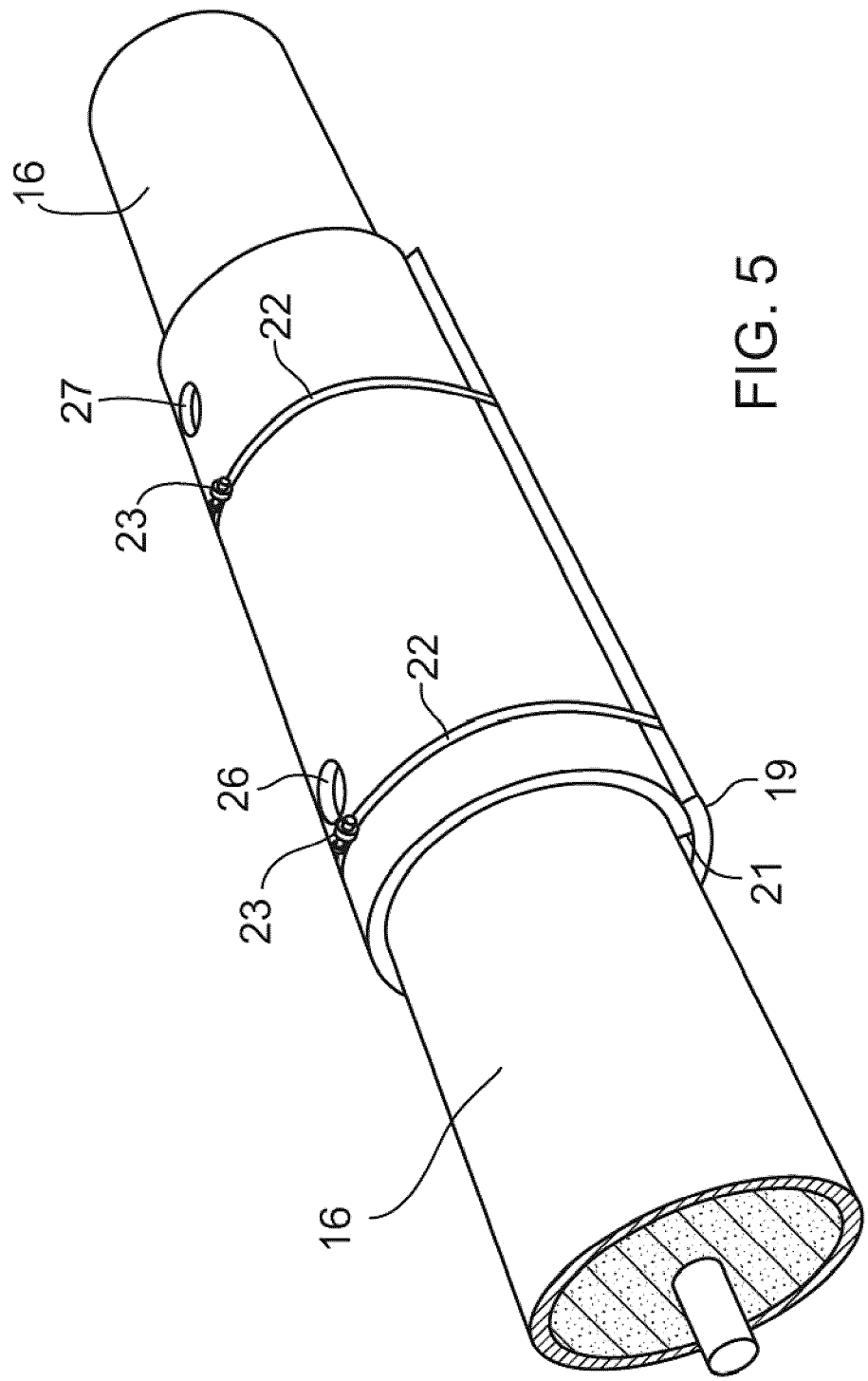

As seen in FIGS. 4 and 5, securing elements, in the form of straps 22, are applied on the sheet 18, as seen in FIGS. 4 and 5. In this example, the straps 22 are passed around mold sheet 18 and their ends are provided with inter-engaging tensioning elements 23 allowing the straps 22 to be tensioned by adjustment of the tensioning devices 23. Various conventional forms of tensioning devices may be employed. The tension in the straps 22 resists any tendency for circumferential separating movement of the overlapped ends 19 and 21 on expansion of the subsequently introduced foam filling.

Sheet 18 is provided with fill and vent openings 26 and 27. Employing a foam filling procedure that in itself is conventional, as seen in FIG. 6, a liquid precursor 29 of a foamable curable resin composition is introduced through the fill opening 26. A funnel 28 may be inserted through the opening 26 to assist positioning of the precursor 29 within the cavity 10. The liquid precursor 29 may be, for example, be a two-part urethane foam composition that is mixed shortly before introducing it through the opening 26. The liquid precursor 29 expands within the cavity, and cures to form a rigid foam filling 30. Once the composition is fully foamed and cured, the straps 22 are removed and the sheet 18 is stripped away, exposing the foamed and cured filling 30 in the form of an annular body of diameter substantially similar or equal to the diameter of the pipe casings 16.

Desirably, the inside of the mold sheet 18 is coated with a release agent to make the sheet 18 readily cleanly strippable from the foam filling 30. This coating may be provided by, for example, a silicone release coating spray or a brushed on coating of carnauba wax composition. Alternatively, the sheet 18 may be lined with a release liner sheet, for example wax paper or a polyolefin, for example, a polyethylene film coated with silicone.

A rubber gasket tape may be applied circumferentially over the pipe jackets 16 adjacent to the cavity and under the mold sheet 18 to prevent foam leakage from the cavity during expansion.

Figure 8:
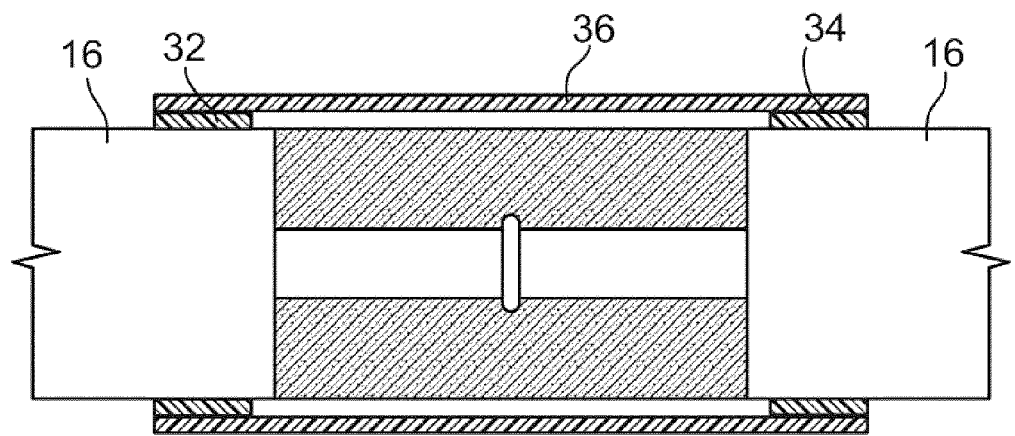
Figure 9:
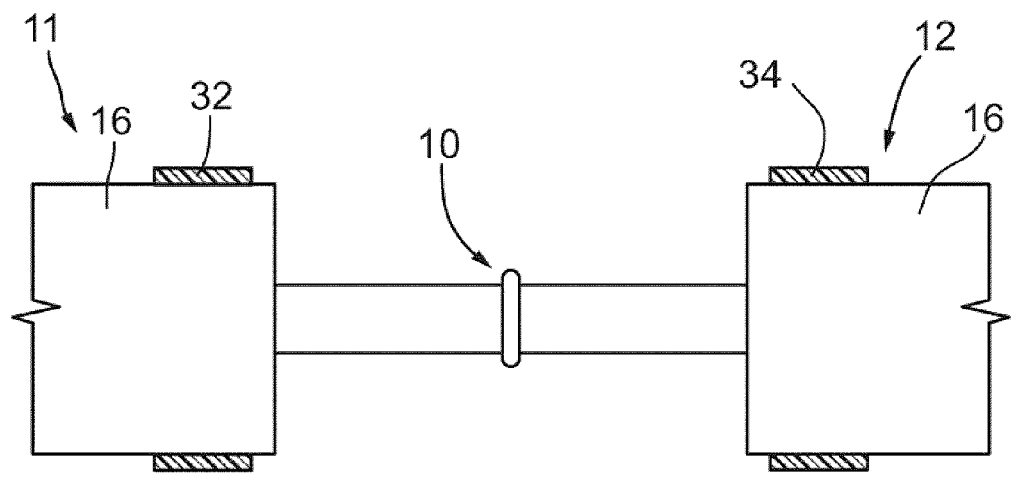
FIGS. 9 through 14 are schematic side views, partially in cross-section, illustrating steps in forming a foam filling in such cavity according to a second embodiment of the invention.

In the preferred form, the foam filling 30 is sealed in water tight fashion by applying tapes of a adhesive sealant 34 around the ends of the pipe jackets 16, and applying a heat shrinkable polymeric casing 36 over the sealant tapes 32 and 34, as seen in FIG. 8 and applying heat, at least to the end portions of the casing 36 overlying the sealant tapes 32 and 34, to heat shrink the casing 36 in tight sealing engagement with the adhesive sealant tapes 32 and 34 and with the adjacent portions of the pipe jackets 16. In some instances the entire casing 36 may be heat shrunk over the joint.

A second preferred embodiment is described below with reference to FIGS. 9 through 14A.

Elements similar to those employed in the procedure described above with reference to FIGS. 1 to 8 are identified by the same reference numerals for the sake of convenience of description.

However, in this example, the adhesive sealant tapes 32 and 34 and heat shrinkable casing 36 are applied before applying the mold sheet 18, and the foam insulation body 30 is formed in contact with an inner surface of the casing 36. Further, the sheet 18 in this example functions as a flexible tensile member that resists ballooning of the casing 36 on expansion of the foam precursor 29.

Figure 11:
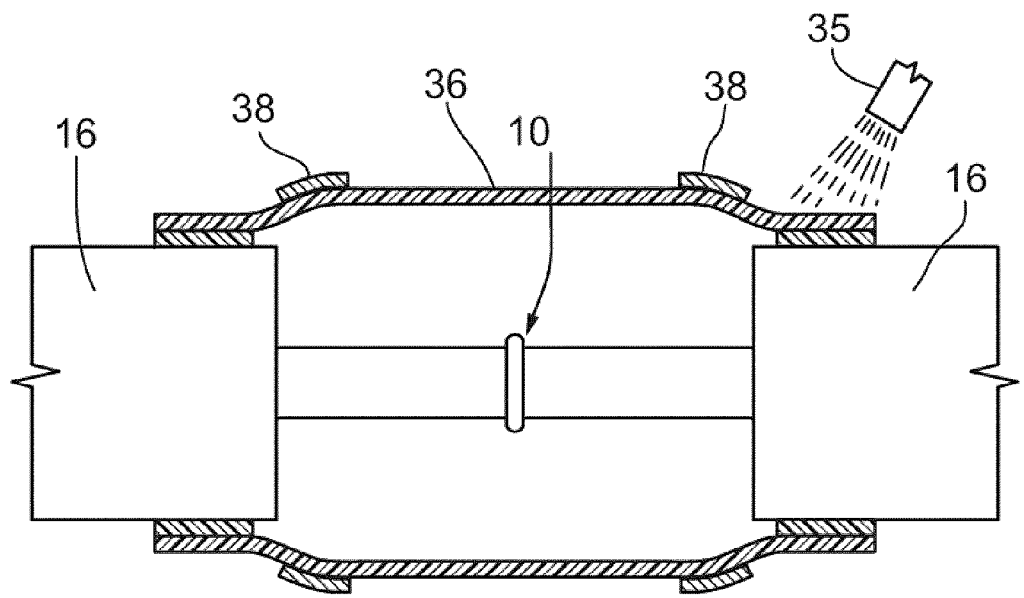
Figure 12:
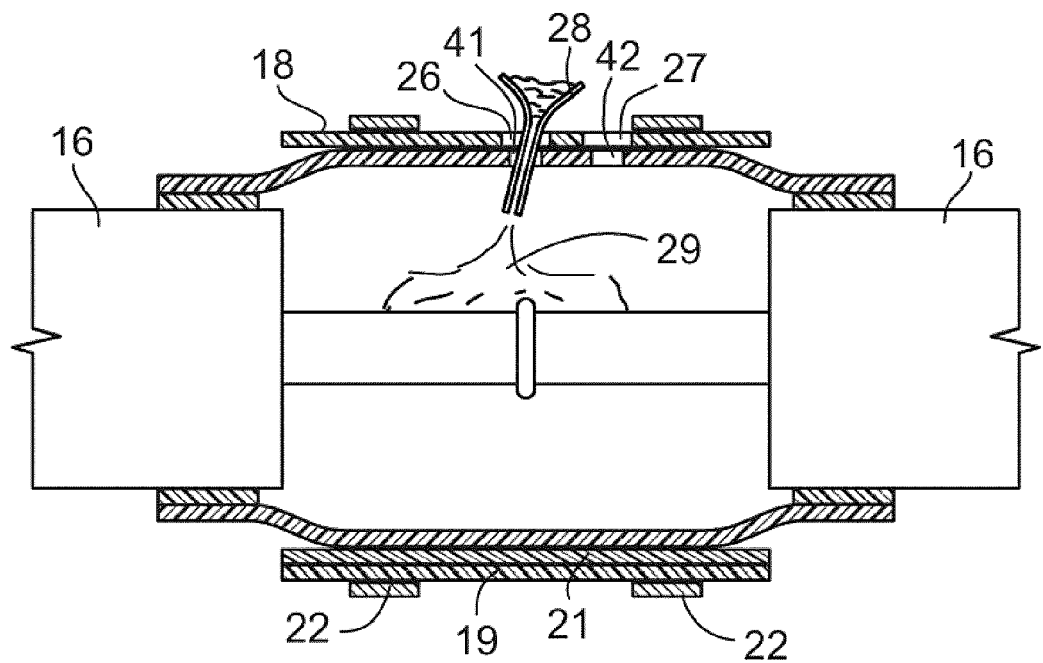
Figure 13:
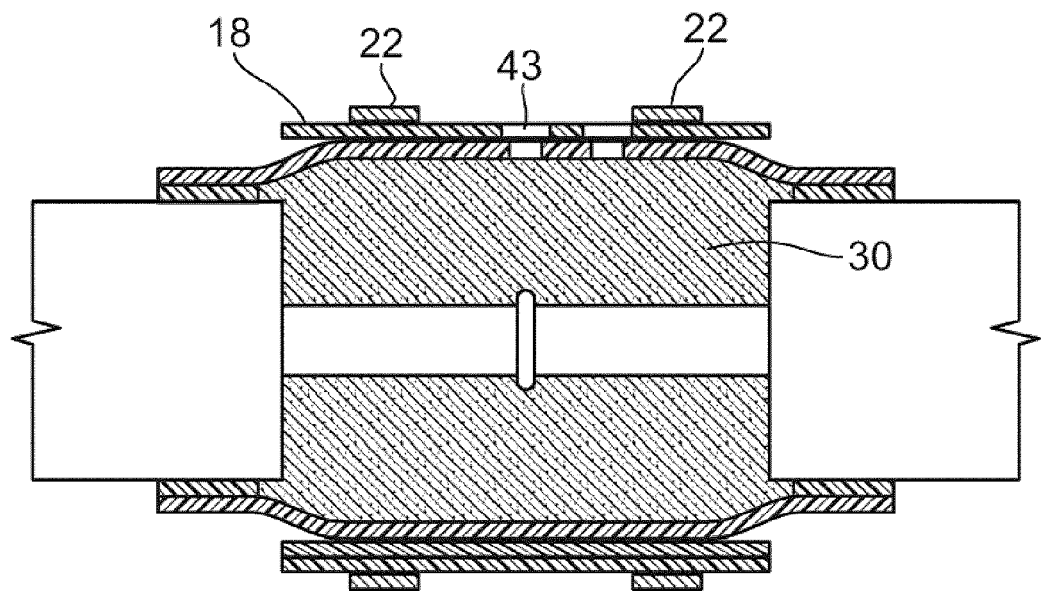
Figure 14:
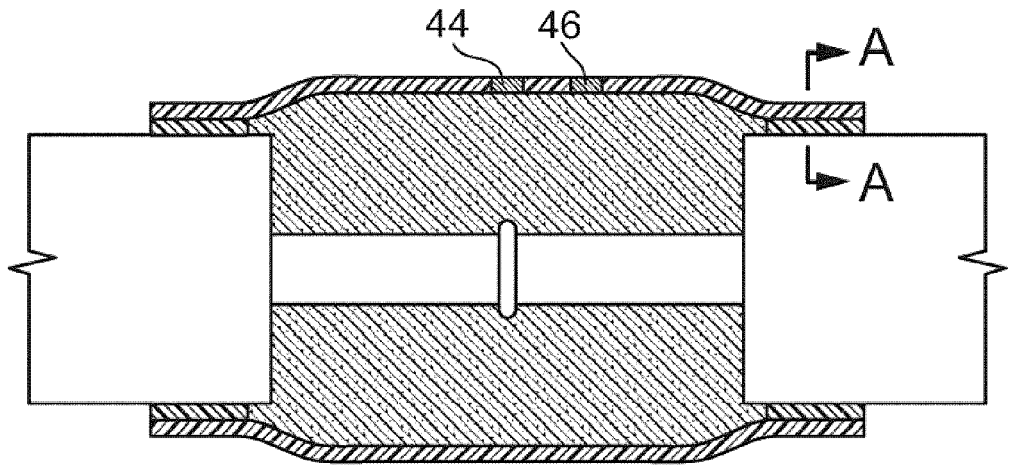
Figure 14A:
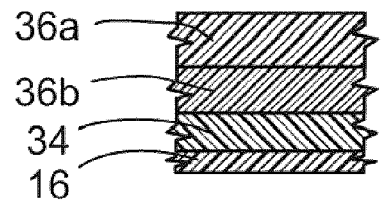
FIG. 14A is a cross-section taken on the lines A-A in FIG. 14.

To prevent a tendency for the casing 36 to shrink down into the cavity 10, heat shielding bands 38, for example high temperature resistant heat insulating bands, such as glass fibre fabric bands, are applied around the casing 36 axially inwardly adjacent the ends of the pipe jacket 16. The ends of the casing 36 are then shrunk down into tight sealing engagement with the sealant tapes 32, 34 and with the ends of the jackets 16, as seen in FIG. 11, for example by applying a gas torch 35 on the ends of the casing 36.

Before or after shrinking, fill and vent openings 41 and 42 are formed through the wall of the casing 36, for example by drilling through the wall. These openings 41 and 42 positioned in registry with the fill and vent openings 26 and 27, respectively, in the subsequently applied sheet 18.

The procedure then generally follows that described above with reference to FIGS. 2 to 6, except the sheet 18 is applied on an exterior side of the casing 36.

If desired, once a sufficient quantity of the foam precursor 29 has been introduced through the fill hole 41, a temporary foaming plug 43 is inserted as a stopper within the opening 41, to encourage the foam to fill the cavity 10 within the casing 36 without excessive leakage of foam through the fill opening 41.

Once the foam has fully formed, and has filled the cavity 10 within the casing 36 and has cured, the straps 22 and sheet 18 are removed. The temporary foaming plug 43 is removed, and polymeric filler plugs 44 and 46 are inserted within the fill and vent openings 41 and 42, respectively, and welded in place in order to seal the casing 36 in water tight fashion.

In one preferred form, in order to facilitate welding of the plugs 44 and 46 to a crosslinked casing 36, the casing 36 may be formed with its wall having outer and inner layers 36a and 36b, the inner layer 36b being uncrosslinked or crosslinked to a lesser degree of crosslinking than the outer layer 36a, which may be crosslinked to a substantially greater degree, so that the polymeric plugs 44 and 46a will weld readily to the portions 36b bordering the holes 41 and 42 formed through the casing 36. This two layer structure for the wall of the casing 36 may be provided by laminating sheets of the materials 36a and 36b together to form a composite sheet, and forming a tubular sleeve from the composite sheet in conventional fashion.

In the examples described above, the casing 36 may have a wall thickness which is constant across the width of the sleeve. If desired, however, a casing which has its middle portion of greater wall thickness than its end portions, such as described in our above-mentioned U.S. Pat. No. 6,355,318 may be employed. The disclosures of U.S. Pat. No. 6,355,318 are hereby incorporated by reference. The greater wall thickness of the middle portion reduces any tendency for the casing to shrink into the cavity 10 in the course of heating the end portions of the casing as described above with reference to FIG. 11. This eliminates the need for the use of heat shielding bands 38 to prevent shrinking of the casing into the cavity 10.

As noted above, the sheet 18 in the above-described procedures allows a relatively thin-walled casing 36 to be employed, if desired, since the casing need not be in itself capable of withstanding the pressure of the expanding foam during the course of forming and curing the film within the cavity 10. This function of withstanding the pressure of the foam is performed by the sheet 18.

Figure 10:
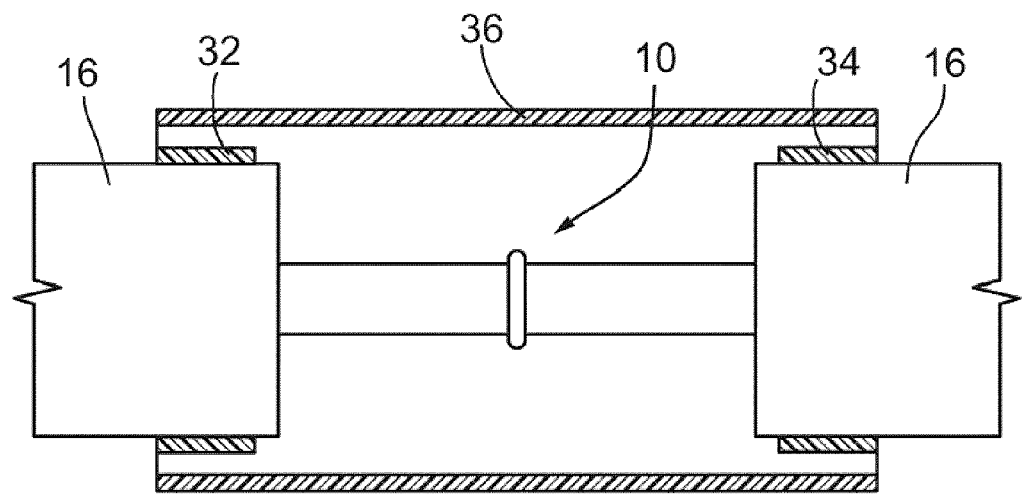

For example, with known procedures before the present invention, in the case of a large diameter insulated pipeline joint, having a jacket 16 of external diameter 1000 mm, it was necessary to use a casing, similar to casing 36 shown in FIG. 10, of wall thickness greater than about 12 mm to avoid ballooning. In the same circumstances, using the procedure of one aspect of the invention as described above with reference to FIGS. 9 to 14a, a casing 36 with wall thickness of 6 mm was employed on the 1000 mm joint. An anti-ballooning sheet 18 comprising glass fibre reinforced epoxy resin was employed. The foam filling 30 comprised polyurethane foam formed from a two-part urethane foam composition mixed together to provide the liquid precursor 29. After the precursor 29 had fully foamed and set, it was found the circumference of the casing had expanded less than 2%, with no visually perceptible ballooning.

While fibre reinforced plastic sheet materials have been described above as examples of one form of sheet material 18 providing sufficient tensile strength to withstand the foam pressure and avoid any tendency for ballooning, other materials that perform this function may, of course, be employed. For example, the mold sheet may be a metal sheet. For example, an aluminum sheet, typically having a Young's modulus of 69 GPa, may be employed. A further example of material as equally effectively as the above-described fiber reinforced plastic sheet or metal sheet comprises flexible fabric sheets, for example, flexible fabric sheets formed of high tensile fibres such as para-aramid (trade-mark KEVLAR) or high tensile glass fibres.

Such metal sheets and fabric sheets are employed in the same manner as the mold sheets 18, as described above with reference to FIGS. 1 to 14, except in the case in which the sheets are not in the form of a resilient coil, the sheets need to be supported once wrapped around the cavity 10, until secured in place by the straps 22.

Figure 15:
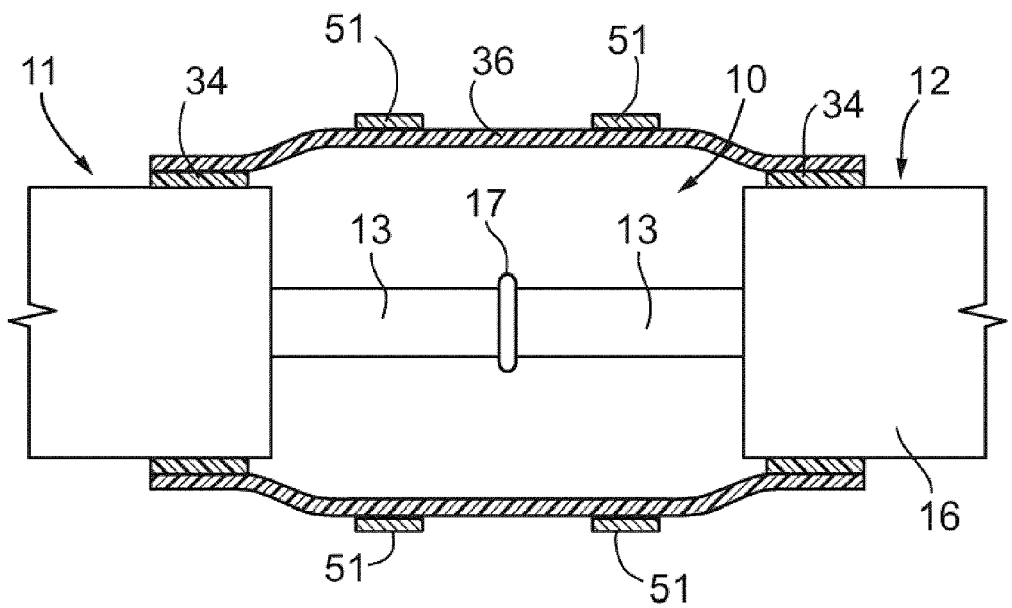
FIG. 15 is a schematic side view, partially in section illustrating a third embodiment of ballooning resistant structure in accordance with the invention.

Instead of applying an anti-ballooning sheet 18 around the casing 36, as described above with reference to FIGS. 9 to 14a, in a further embodiment as illustrated for example in FIG. 15, flexible tensile members in the form of strap elements 51 are applied around the casing. The procedure is otherwise similar to that described above with reference to FIGS. 9 to 14a. The strap elements 51 are tensioned using conventional strap tensioning devices so that they engage snugly around the casing 36 before the foam filling precursor 29 is introduced.

The strap elements 51 may be, for example, conventional polypropylene or nylon webbing straps woven from, for example, multifilament yarn.

The invention claimed is:

1. A method of foam filling a cavity in a joint between insulated pipe lengths, the method comprising:
    providing adjacent insulated pipe lengths having a cavity there-between;
    applying a casing to extend over ends of both of said insulated pipe lengths and over the cavity, the casing covering the cavity, and the casing being at least partially heat shrinkable;
    wrapping heat shielding bands around the casing over the cavity and axially inwardly adjacent to the ends of the insulated pipe lengths;
    heating at least end portions of the casing to shrink and sealingly engage said casing end portions with said ends of both insulated pipe lengths, said heat shielding bands preventing said heating from being applied to a middle portion of the casing lying over the cavity;
    wrapping at least one temporary flexible tensile member around the casing;
    introducing a curable foam precursor in said cavity through an opening in the casing;
    allowing said precursor to foam, fill the cavity, and cure, the at least one temporary flexible member having tensile strength that applies pressure to the casing to resist ballooning of the casing on expansion of the foam during said filling and curing; and
    removing said at least one temporary flexible tensile member.

2. The method according to claim 1 wherein during said heating step, said heat shielding bands prevent the casing from shrinking down into said cavity.

3. The method according to claim 1 wherein said at least one temporary flexible member comprises at least two strap elements.

4. The method according to claim 1 wherein a securing element comprising a flexible sheet material is wrapped around the casing during said foaming, the at least one temporary flexible tensile member being wrapped around said flexible sheet.

5. The method according to claim 4 wherein said flexible sheet is a fibre reinforced plastic sheet comprising a resiliently flexible coil, a metal sheet, or a flexible fabric sheet comprising high tensile fibres.

6. The method according to claim 1 wherein the casing comprises an inner layer and an outer layer and the inner layer is uncrosslinked or is crosslinked to a lesser degree than the outer layer.

7. The method according to claim 1 wherein after said heating step, said heat shielding bands overlap both heat shrunk portions of said casing and non-heat shrunk portions of said casing.

8. A method of foam filling a cavity in a joint between insulated pipe lengths, the method comprising:
    providing adjacent insulated pipe lengths having a cavity there-between;
    applying an adhesive sealant tape around ends of each of the insulated pipe lengths;
    applying a casing to extend over said ends of both insulated pipe lengths including over each of said sealant tapes applied therearound and over the cavity, the casing covering the cavity and having a fill opening and a vent opening, and the casing being at least partially heat shrinkable;
    wrapping heat shielding bands around the casing over the cavity and axially inwardly adjacent to the ends of the insulated pipe lengths;
    heating at least end portions of the casing to shrink and sealingly engage said casing end portions with said ends of both insulated pipe lengths via each of said sealant tapes, said heat shielding bands preventing said heating from being applied to a middle portion of the casing lying over the cavity;
    temporarily securing at least one temporary flexible tensile member having tensile strength around the casing;
    introducing a curable foam into said cavity through said fill opening in said casing and allowing the curable foam to foam, fill said cavity, and cure within said cavity, said at least one temporary flexible tensile member applying said tensile strength to the casing to resist ballooning of the casing on expansion of said foam filling said cavity;

providing a temporary foaming plug into the vent opening to ensure filling of the cavity during said foaming, filling, curing;

after said curing is complete, removing said temporary foaming plug and said at least one temporary flexible tensile member; and providing a filler plug into each of said fill opening and said vent opening.

9. The method of claim 8 wherein the casing is a heat shrinkable polymeric casing.

10. The method of claim 8 wherein the casing is secured and heat shrunk to each of the adhesive sealant tapes by said heating of ends of said casing overlying each of said adhesive sealant tapes.

11. The method of claim 8 wherein during said heating step, said heat shielding bands allow said heating to be applied to said end portions of the casing so as to sealingly engage said casing with each of the adhesive sealant tapes on said ends of the insulated pipe lengths.

12. The method of claim 11 wherein the heat shielding bands comprise high temperature heat resistant insulating bands, whereby after the step of heating, said heat shielding bands overlap both heat shrunk portions of said casing and non-heat shrunk portions of said casing.

13. The method of claim 8 wherein the at least one temporary flexible tensile member comprises at least one flexible strap element.

14. The method of claim 8 wherein the filler plugs provided into each of said fill opening and said vent opening are polymeric filler plugs.

15. The method of claim 14 wherein the casing has inner and outer wall surfaces, the outer wall surface being crosslinked while the inner wall surface is crosslinked to a lesser degree than said outer wall surface, said polymeric filler plugs being welded to said inner and outer wall surfaces.

16. The method of claim 15 wherein the casing comprises a first laminating sheet as the outer wall surface and a second laminating sheet as the inner wall surface, said first and second laminating sheets together forming said casing.

17. The method of claim 8 wherein the casing has a greater thickness at a middle portion thereof to reduce shrinking of said casing into said cavity during heating at least end portions of the casing.

18. A method of foam filling a cavity in a joint between insulated pipe lengths, the method comprising:

providing adjacent insulated pipe lengths having a cavity there-between;

applying an adhesive sealant tape around ends of each of the insulated pipe lengths;

applying a heat shrinkable polymeric casing extending partially over ends of both insulated pipe lengths to cover the cavity and overly each of the adhesive sealant tapes around said ends of the insulated pipe lengths;

wrapping heat resistant shielding bands around the casing over the cavity and axially inwardly adjacent the ends of the insulated pipe lengths;

heating only end portions of the heat shrinkable polymeric casing whereby said heat resistant shielding bands prevent heat from being applied to a middle portion of said casing while allowing heat to be applied to said end portions of the casing so as to sealingly engage end portions of said heat shrinkable polymeric casing to each of said adhesive sealant tapes around said ends of the insulated pipe lengths;

wrapping two or more securing temporary flexible strap elements around the casing;

introducing a curable foam into said cavity through a fill opening in said casing to foam, fill said cavity, and cure within said cavity, said flexible strap elements applying tension to the casing to resist ballooning of the casing on expansion of said foam filling said cavity;

after said curing is complete, removing said two or more securing temporary flexible strap elements; and providing a filler plug into said fill opening in said casing.

19. The method of claim 18 wherein the temporary flexible strap elements comprise a polypropylene material or woven nylon webbing.

* * * * *